United States Patent
Zheng et al.

(10) Patent No.: US 10,202,663 B2
(45) Date of Patent: Feb. 12, 2019

(54) SHOT PEENING TREATMENT FOR CAVITATION EROSION RESISTANCE

(71) Applicant: Hitachi, Ltd., Tokyo (JP)

(72) Inventors: Lili Zheng, Farmington Hills, MI (US); Wei Yuan, Novi, MI (US)

(73) Assignee: Hitachi, Ltd., Tokyo (JP)

( * ) Notice: Subject to any disclaimer, the term of this patent is extended or adjusted under 35 U.S.C. 154(b) by 365 days.

(21) Appl. No.: 15/214,595

(22) Filed: Jul. 20, 2016

(65) Prior Publication Data

US 2018/0023153 A1    Jan. 25, 2018

(51) Int. Cl.
| | |
|---|---|
| *B23P 25/00* | (2006.01) |
| *C21D 7/06* | (2006.01) |
| *B24B 39/00* | (2006.01) |
| *C22C 38/00* | (2006.01) |
| *C22C 38/02* | (2006.01) |
| *C22C 38/44* | (2006.01) |
| *C22C 38/58* | (2006.01) |
| *C21D 6/00* | (2006.01) |
| *C22C 38/40* | (2006.01) |
| *B24C 1/10* | (2006.01) |
| *C21D 11/00* | (2006.01) |

(52) U.S. Cl.
CPC ............... *C21D 7/06* (2013.01); *B23P 25/00* (2013.01); *B24B 39/006* (2013.01); *C21D 6/002* (2013.01); *C22C 38/002* (2013.01); *C22C 38/02* (2013.01); *C22C 38/40* (2013.01); *C22C 38/44* (2013.01); *C22C 38/58* (2013.01); *B24C 1/10* (2013.01); *C21D 11/00* (2013.01); *C21D 2211/001* (2013.01); *Y10T 29/479* (2015.01)

(58) Field of Classification Search
CPC ....... C21D 7/06; C21D 2211/001; B24C 1/10; Y10T 29/479; B23P 25/00
See application file for complete search history.

(56) References Cited

U.S. PATENT DOCUMENTS

| | | | |
|---|---|---|---|
| 3,844,846 A | * | 10/1974 | Friske ...................... C21D 7/06 72/53 |
| 4,379,745 A | * | 4/1983 | Polizzotti ............... C10G 9/203 148/284 |
| 4,424,083 A | * | 1/1984 | Polizzotti ............... C10G 9/203 148/286 |
| 5,592,841 A | | 1/1997 | Champaigne |
| 5,733,392 A | | 3/1998 | Usher |

(Continued)

OTHER PUBLICATIONS

Kirk, D., "Size and Variability of Cast Steel Shot Particles", The Shot Peneer, Winter 2009, pp. 24-32.

(Continued)

*Primary Examiner* — Jermie Cozart

(74) *Attorney, Agent, or Firm* — Mattingly & Malur, PC

(57) ABSTRACT

In some examples, a material may be subject to shot peening of a relatively long duration to improve cavitation erosion resistance of the material. For example, the material surface may be shot peened to cause grain reduction and an increase in hardness to a depth of 60 μm or more, while the surface remains relatively smooth. As one example, the method may include treating a surface of austenitic stainless steel by impacting the surface with shot media for a treatment duration of 15 to 40 minutes at a shot peening intensity corresponding to an Almen strip type A intensity of 5A to 10A.

20 Claims, 7 Drawing Sheets

(56) References Cited

U.S. PATENT DOCUMENTS

| | | | | |
|---|---|---|---|---|
| 6,344,097 B1 * | 2/2002 | Limoges | ................... | C22F 1/10 |
| | | | | 148/592 |
| 7,159,425 B2 * | 1/2007 | Prevey | ..................... | C21D 7/06 |
| | | | | 29/90.7 |
| 7,568,368 B2 | 8/2009 | Scarlin et al. | | |
| 7,677,070 B2 * | 3/2010 | Kobayashi | ................ | B24C 1/10 |
| | | | | 148/525 |
| 2015/0231763 A1 * | 8/2015 | Lemke | ................... | B24C 11/00 |
| | | | | 72/53 |

OTHER PUBLICATIONS

J, H. et al., "Effect of Shot Peening Time on Fatigue Properties of Stainless Steel Shaft Turbine", Journal of Engineering and Development, Dec. 2012, pp. 411-424, vol. 16, No. 4.

Da Silva Peltz, J. et al., "Effect of the Shot Peening Process on the Corrosion and Oxidation Resistance of AlSl430 Stainless Steel", 2015, pp. 538-545, vol. 18 No. 3.

* cited by examiner

SHOT PEENING TREATMENT FOR CAVITATION EROSION RESISTANCE

BACKGROUND

Cavitation is the formation of vapor cavities in a liquid, which may be liquid-free zones that result from forces acting upon the liquid, such as may occur in pumps, valves, impellers, turbines, propellers, and the like. For instance, when a liquid is subjected to rapid pressure changes, cavities may form at locations where the pressure is relatively low. In some cases, the cavities may implode and generate shock waves, such as when higher pressures are involved. Collapsing cavities that implode near to a metal surface may cause cyclic stress in the metal, resulting in surface wear referred to as cavitation erosion. For instance, pitting caused by the collapse of the cavities may produce wear on metal components, which may significantly reduce the life of pumps, propellers, and other components.

SUMMARY

Some implementations include a method to improve cavitation erosion resistance of a workpiece by subjecting the workpiece to shot peening of a relatively long duration. For example, the workpiece surface may be shot peened to cause grain reduction and an increase in hardness to a depth of 60 μm or more, while the surface of the workpiece may remain relatively smooth. As one example, the method may include treating a surface of austenitic stainless steel by impacting the surface with shot media for a shot peening treatment duration of 15 to 40 minutes at a shot peening intensity corresponding to an Almen strip type A intensity of 5A to 10A. In some cases, the shot peening duration by range from 20 to 30 minutes at an intensity of 5A to 7A.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The technology herein includes novel arrangements and techniques for a cold working surface treatment that can improve the cavitation erosion resistance up to 350% in austenitic stainless steel, such as SAE 316 series stainless steel, SAE 304 series stainless steel, and so forth. In some examples, the process may include shot peening the surface with cast steel shot for up to 40 minutes. For instance, at least a portion of the workpiece surface susceptible to cavitation erosion may be treated. In some examples, the shot peening may be followed by surface polishing of the workpiece at least at the shot peened location of the workpiece susceptible to cavitation erosion. No heat treatment is required in the examples herein. In some cases, the surface treatment may be applied to components such as pumps, valves, impellers, turbines, propellers, and other fluid system components that operate under a cavitation erosion environment.

In some examples, the shot peening may be performed for a shot peening duration ranging between 15 and 40 minutes, and more particularly in some cases, for a shot peening duration ranging between 20 and 30 minutes. Furthermore, in some examples, the shot peening may be performed at a shot peening intensity ranging from 5A to 10A as determined from an Almen type A strip and #2 gauge, and more particularly in some cases, a shot peening intensity ranging from 5A to 7A. Surprising, the long duration shot peening methods performed at the durations and intensities recited herein provide unexpectedly deep penetration of grain size reduction while imparting a low surface roughness.

For discussion purposes, some example implementations are described in the environment of surface treatment of a workpiece using shot peening for an extended duration at a selected intensity using a selected shot media. However, implementations herein are not limited to the particular examples provided, and may be extended to other service environments, other types treated components, other types of shot media, and so forth, as will be apparent to those of skill in the art in light of the disclosure herein.

Figure 1:
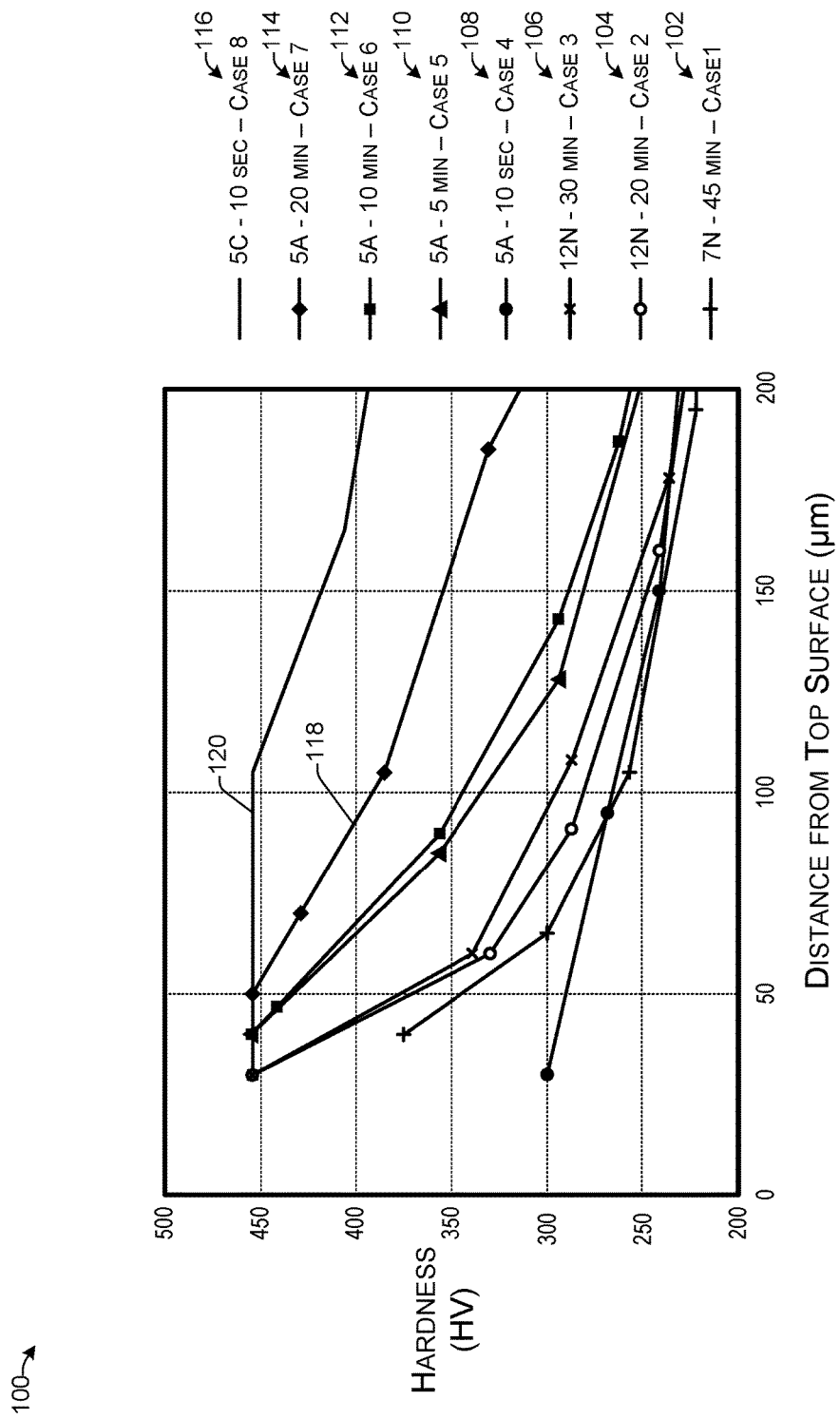
FIG. 1 illustrates an example graph including hardness vs. depth for a plurality of different shot peening treatments of different intensities and durations according to some implementations.

FIG. 1 illustrates an example graph 100 indicating relative hardness versus distance from the treated surface according to some implementations. In this example, sample workpieces of SAE 316 series stainless steel (SST) were treated using shot peening at a variety of different intensities for a variety of lengths of time to demonstrate the advantages of the disclosed treatment. For example, SAE 316 (UNS 31600; European normal 1.4401) SST typically includes as alloying materials approximately 16-18% Cr, 10-14% Ni, Max 0.08% C, Max 2% Mn, Max 1% Si, Max 0.045% P, Max 0.03% S, and 2.0-3.0% Mo. Further, while 316 series SST is used in this example, other austenitic stainless steels, such as SAE 304 series SST may be used in other examples. For instance, SAE 304 (UNS 31400; European normal 1.4301) typically includes as alloying materials approximately 18-20% Cr, 8-10.5% Ni, Max 0.08% C, Max 2% Mn, Max 1% Si, Max 0.045% P, and Max 0.03% S. Additional types of austenitic stainless steels are well known in the art, and the compositions are not provided herein in detail.

In the examples herein, the workpiece is subjected to shot peening of a relatively long duration as compared with conventional shot peening treatments of steel and stainless steel. For instance, shot peening may be applied herein as a cold working process that produces a compressive residual stress layer, which modifies the mechanical properties of the workpiece by reducing the grain size and increasing the hardness. The shot peening herein includes impacting the surface of the workpiece with shot media (e.g., metal, glass, or ceramic particles) with force sufficient to create plastic deformation in the surface of the workpiece.

Typically, fatigue and stress corrosion failures may originate at the surface of a part. However, following the shot peening process herein, a compressively stressed zone is created on the surface and to a substantial depth under the surface, having an increased hardness that inhibits cavitation erosion. For instance, the shot peening process herein may create a uniform layer of compressively stressed material to a distance under the surface that is substantially deeper than any surface irregularities created on the surface. Further, the treatment herein may improve resistance to fatigue failures, corrosion fatigue, stress corrosion cracking, and hydrogen assisted cracking.

In some examples herein, an Almen strip may be used to quantify the intensity of the shot peening process, such as based on the SAE (Society of Automotive Engineers) J442 standard. For instance, John O. Almen created the Almen strip, typically a strip of SAE 1070 steel having a hardness of 45-48 HRC, to measure the intensity of a shot peening blast stream. Almen strips are classified into three types: "N", "A", and "C". The three types of Almen strips differ in relative thickness, while having the same width and length. In particular, A strips are thicker than N strips, and C strips are thicker than A strips. The approximate relationship is 3N=A=0.3C.

The shot peening intensity may be expressed based on the arc height followed by the Almen strip used. For example, the intensity designation for a 0.012 inch (0.30 mm) arc height using the A strip is 0.012A, which may be simplified to "12A" herein. Generally, the A strips are used most often; however, if the resulting arc height of an A strip is less than 0.004 in (0.10 mm), then an N strip may be used. On the other hand, if the arc height of an A strip is greater than 0.020 in (0.51 mm) then a C strip may be used. An Almen #2 gauge may typically be used to measure the arc heights herein.

When setting up a shot peening process, the intensity may first be determined. To accomplish this, an Almen strip may be placed in the intended path of the shot media, such as in a shot peening chamber in place of the workpiece to be shot peened. The shot is accelerated against the strip at a selected setting for a selected duration T, and the compressive stress resulting from the shot peening causes the Almen strip to deform upward into an arc. A gauge may be used to measure the height of the arc to determine the amount of deformation. After a first strip reaches a first arc deformation at time T, a second Almen strip may then be impacted with the same intensity for twice the time (2T). If the second strip deforms less than 10% more than the first strip, then intensity saturation is considered to be reached at time T for an intensity corresponding to the height of the arc at time T. Additionally, another technique for measuring the intensity of a shot peening process is the use of an Almen round, rather than a strip, which operates on the same basic principles.

As illustrated in FIG. 1, a plurality of samples of 316 SST were subjected to shot peening for various different lengths of time and various different intensities. For example, 316 SST may have a Vicker's Hardness (HV) that typically ranges from 150 HV to max 220 HV in the annealed condition. The shot peening surface treatment method herein includes improving the cavitation erosion resistance using relatively long duration shot peening that increases the depth of the enhanced material while minimizing the surface irregularities created by the treatment. The shot peening process herein increases the hardness of the material surface, thereby improving the resistance of the material surface to cavitation erosion. The method also introduces grain size reduction, which yields higher strength and better elongation. Thus, the shot peening process herein is able to generate a sufficiently thick grain size reduction layer, i.e., an increased hardness layer, which is able to provide improved cavitation erosion resistance on the material surface.

In some examples, the long duration shot peening method herein employs a shot peening duration of 15-40 minutes, and more particularly, in some cases, from 20-30 minutes. Further, the intensity and shot size may be selected to minimize the effect on the surface roughness of the workpiece while still providing superior penetration. For example, the shot peening intensity may be range from 5A to 10A for austenitic stainless steels, and more particularly, from 5A to 7A.

The shot peening duration herein may be significantly longer than conventional shot peening processing durations, which may often be less than 60 seconds. Surprisingly, the increase in the shot peening processing duration over 15 minutes is able to produce a dramatic increase in the depth of penetration of the changed surface properties of the material while the surface itself remains substantially smooth. The experimental results show that the long duration shot peening herein is able to increase the depth of the grain size reduction layer and increased hardness up to 60 μm or more.

In some cases, following the completion of the long duration shot peening, polishing of the treated surface may be performed without requiring grinding or other substantial machining for creating a smooth polished surface at the treated area. For instance, the polishing may be performed using any suitable technique that does not heat the surface to any significant extent. Examples of polishing techniques include the use of wheels of leather, canvas, cotton cloth, and so forth. Further, in some examples, polishing may include buffing, or buffing may replace polishing. Additionally, in some examples, such as when the surface roughness is less than 10 μm, polishing may be skipped altogether.

Figure 2:
FIG. 2 illustrates an example data structure of various cases according to some implementations.

In the illustrated example of FIG. 1, the sample material is 316 stainless steel having an approximate hardness of 190 HV in the annealed condition. As also illustrated in FIG. 2, eight different cases are presented including: Case 1 102 in which the shot peening is performed at an intensity of 7N for 45 minutes; Case 2 104 in which the shot peening is performed at an intensity of 12N for 20 minutes; Case 3 106 in which the shot peening is performed at an intensity of 12N for 30 minutes; Case 4 108 in which the shot peening is performed at an intensity of 5A for 10 seconds; Case 5 110 in which the shot peening is performed at an intensity of 5A for 5 minutes; Case 6 112 in which the shot peening is performed at an intensity of 5A for 10 minutes; Case 7 114 in which the shot peening is performed at an intensity of 5A for 20 minutes; and Case 8 116 in which the shot peening is performed at an intensity of 5C for 10 seconds.

For the examples discussed above, the shot peening was performed using cast steel shot size S330 having a diameter of 0.84 mm. However, in implementations herein, shot size for steel shot may range from about S70 (0.18 mm) to S660 (1.68 mm) as long as the specified intensity can be attained. In some examples herein, shot size at the smaller end of the range that is still able to attain the specified intensity may be used so that any increase in surface roughness from the treatment is maintained at a minimum. Furthermore, similar sizes of iron shot, cut wire shot equivalents, or other shot media may also be used in some examples herein. As individual shot media may break, the broken particles may be removed to reduce the chance of sharp edges that may cause an increase in surface roughness.

Each of the Cases 1-8 (reference numbers 102-116, respectively) is plotted on the graph 100, showing the hardness as a function of the distance from the top surface of the respective workpiece. All of the illustrated shot peening examples provide some increase of hardness on the top surface of the respective workpieces. The thickness of the increased hardness layer may correspond to a depth of penetration of grain size reduction caused by the shot peening, and further corresponds to an increase in resistance to cavitation erosion. As the distance from the top surface increases, the hardness decreases toward the hardness value of the untreated material. For example, for Cases 1, 2, and 3, performed at intensities of 7N and 12N, respectively, significant hardness improvement occurs at a depth of less than 100 μm and decreases relatively rapidly. Thus, the layer of increased hardness is relatively thin. For Case 4, performed at intensity 5A, the hardness improvement is not nearly as significant as other durations at the same intensity, e.g., Cases 5-7, which are also performed at intensity 5A.

Furthermore, for Cases 5 and 6, performed at intensity 5A for 5 minutes and 10 minutes respectively, the depth of the increase in hardness is not as significant as for Case 7, which is performed at intensity 5A for 20 minutes. For example, there is not much improvement between Case 5 and Case 6 despite the fact that case 6 is performed for twice the duration of Case 5. Accordingly, it is unexpected that the depth of the hardness improvement for Case 7 is significantly better than that for Case 6 when comparing the relative improvements between Case 5, Case 6, and Case 7. In particular, for Case 7, as indicated on the graph at 118, even at a depth of 80-90 μm, the hardness of the sample remains doubled over that of the annealed material. As discussed below, the surface roughness following the treatment was about 7-17 μm in several different samples. Thus, in some cases, subsequent polishing may be skipped or, in other cases, only minimal polishing of the surface might be performed. Furthermore, additional shot peening duration at this intensity, e.g., increasing the duration to 30-40 minutes results in further penetration depth of the grain size reduction layer and increased hardness without any substantial effect on surface roughness.

On the other hand, while Case 8 resulted in a higher penetration depth, as indicated at 120, the resulting surface roughness was approximately 80 μm, which may require grinding or other significant machining techniques to be employed following the shot peening treatment. For instance, if the surface becomes too rough, polishing within a machining allowance is not practical. Thus, additional machining, such as grinding, may be required, which may change the surface properties and/or add to the cost of manufacture. For instance, when applying grinding following surface treatment, the grinding temperature must be carefully controlled to prevent localized heating, which may change the surface properties. However, such machining techniques may be difficult to implement consistently. Accordingly, Case 8 may not provide a desirable result compared to Case 7 based on a comparison of surface roughness to penetration.

Accordingly, the examples herein employ long duration shot peening surface treatment to improve cavitation erosion resistance. The surface treatment techniques herein generate a grain size reduction layer corresponding to an increased hardness layer on the material surface to a depth that is substantially increased over shorter durations without significantly affecting the surface roughness. The target material is not limited to 316 series stainless steel, but may be applied to other austenitic stainless steels as well. A general guideline may be to increase the processing time and/or intensity if the annealed material is harder. The long duration shot peening process herein is a cold working process that eliminates problems that may be caused by high temperatures or other types of treatments. Furthermore, the long duration shot peening process herein may be combined with other surface modification techniques to further improve the cavitation erosion resistance. As one example, the shot peening technique herein may be combined with a nitrogen bath treatment that may be first applied to the workpiece before the shot peening is performed.

As mentioned above, FIG. 2 illustrates an example data structure 200 showing the parameters for each of Cases 1-8 according to some implementations. In particular, data structure 200 includes the intensity 202 and the duration 204 of the shot peening process for each of cases 1-8 as indicated by reference numbers 102-116.

Figure 3:
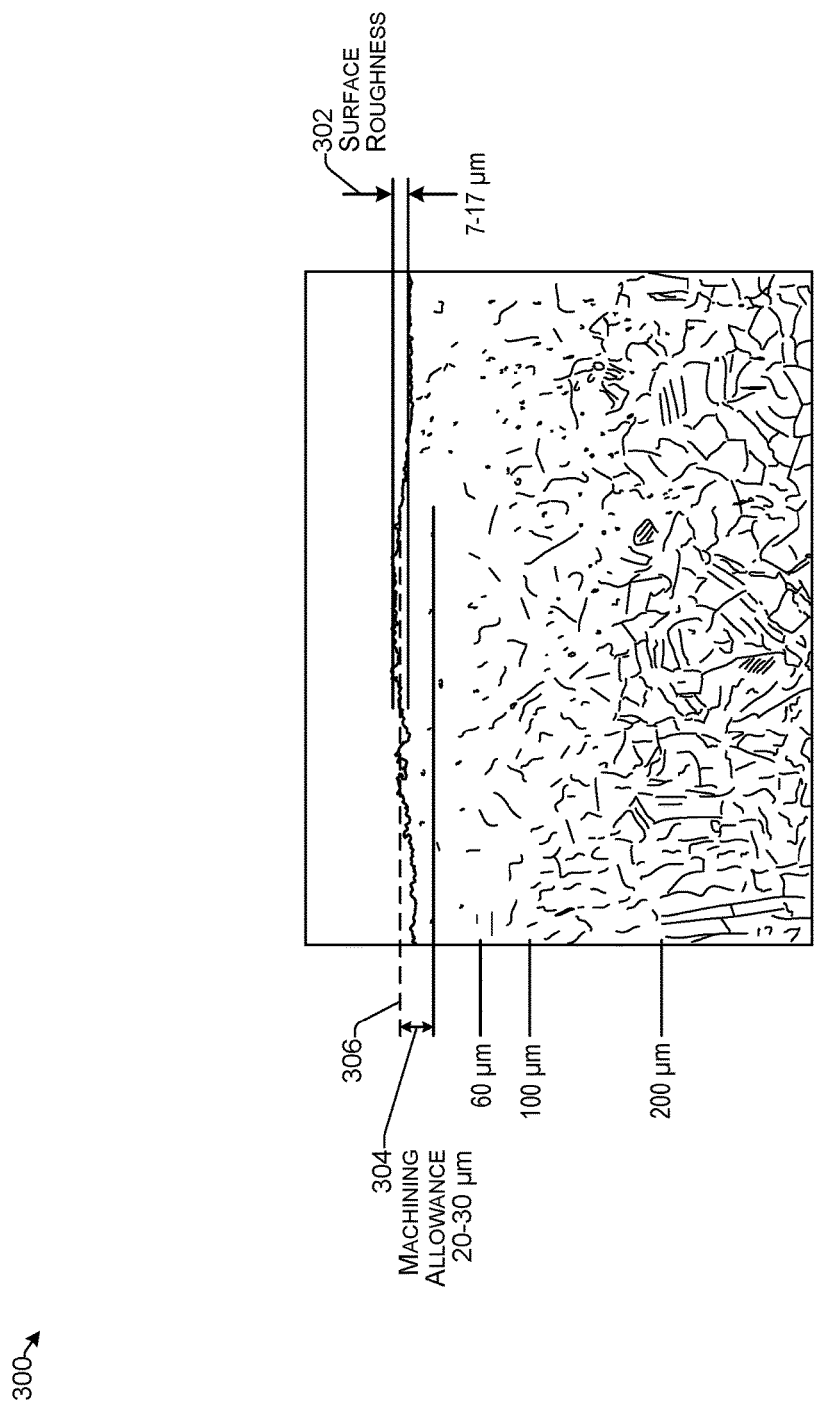
FIG. 3 illustrates an example cross section of a sample subjected to surface treatment according to some implementations.

FIG. 3 illustrates an enlarged view representative of a cross section 300 of a sample of material corresponding to Case 7 according to some implementations. In this example, the grain structure within 60 μm of the surface is reduced in size. Accordingly, there may be some nanostructure grains on the top surface, and the grain size reduction layer appears to be at least 60 μm thick, corresponding to the increased hardness shown in FIG. 1 above. Based on several samples, as indicated at 302, the surface roughness for Case 7 was determined be between 7 and 17 μm. Accordingly, if 20 μm is removed by polishing as a machining allowance 304, there will still be at least a 40 μm thick layer in which grain size reduction has occurred and hardness is substantially increased. In this example, the machining allowance 304 for polishing may be measured, e.g., from the location of an average surface level 306. Since, following polishing, the remaining material still has a hardness over 450 HV, the cavitation erosion resistance of the workpiece may be much improved over the untreated material.

Figure 4:
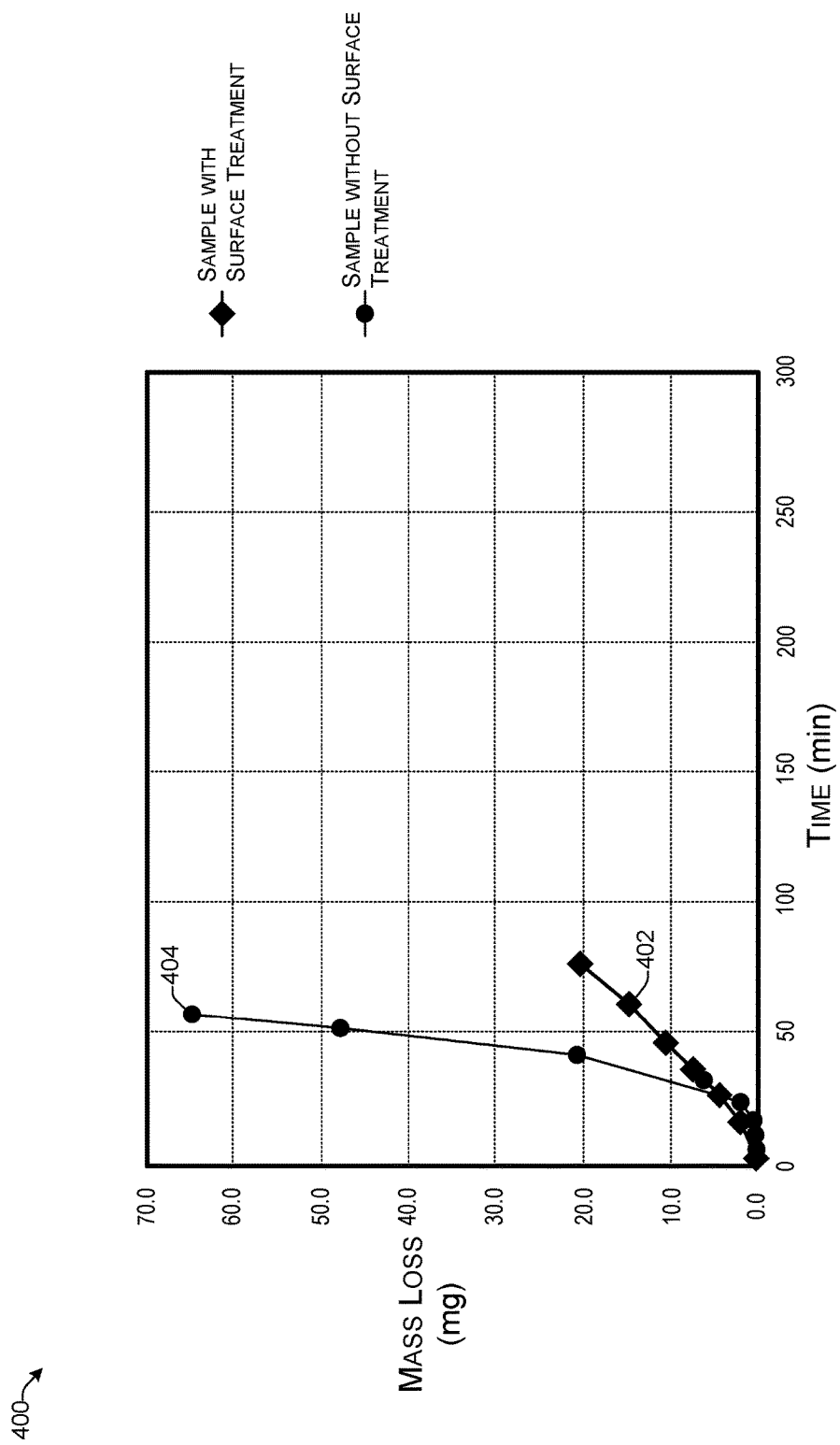
FIG. 4 illustrates an example graph showing results of a cavitation erosion test according to some implementations.

FIG. 4 illustrates an example graph 400 showing comparative mass loss over time for an untreated sample and a sample having the surface treatment of Case 7 according to some implementations. In this example, as a result of polishing the treated surface, approximately 20 μm of material was removed from the top of the sample of Case 7. A cavitation erosion test was carried out on the sample of Case 7 and an untreated sample using a vibratory apparatus in liquid. The results of the cavitation erosion test are illustrated in graph 400. The graph 400 shows significant improvement in cavitation erosion resistance for the treated sample. For example, after about one hour of testing, as indicated at 402, the treated sample has lost approximately 15 mg of mass, while the untreated sample has lost approximately 65 mg of mass. Thus, the cavitation erosion resistance of the treated sample is over four times better than that of the untreated sample.

Figure 5:
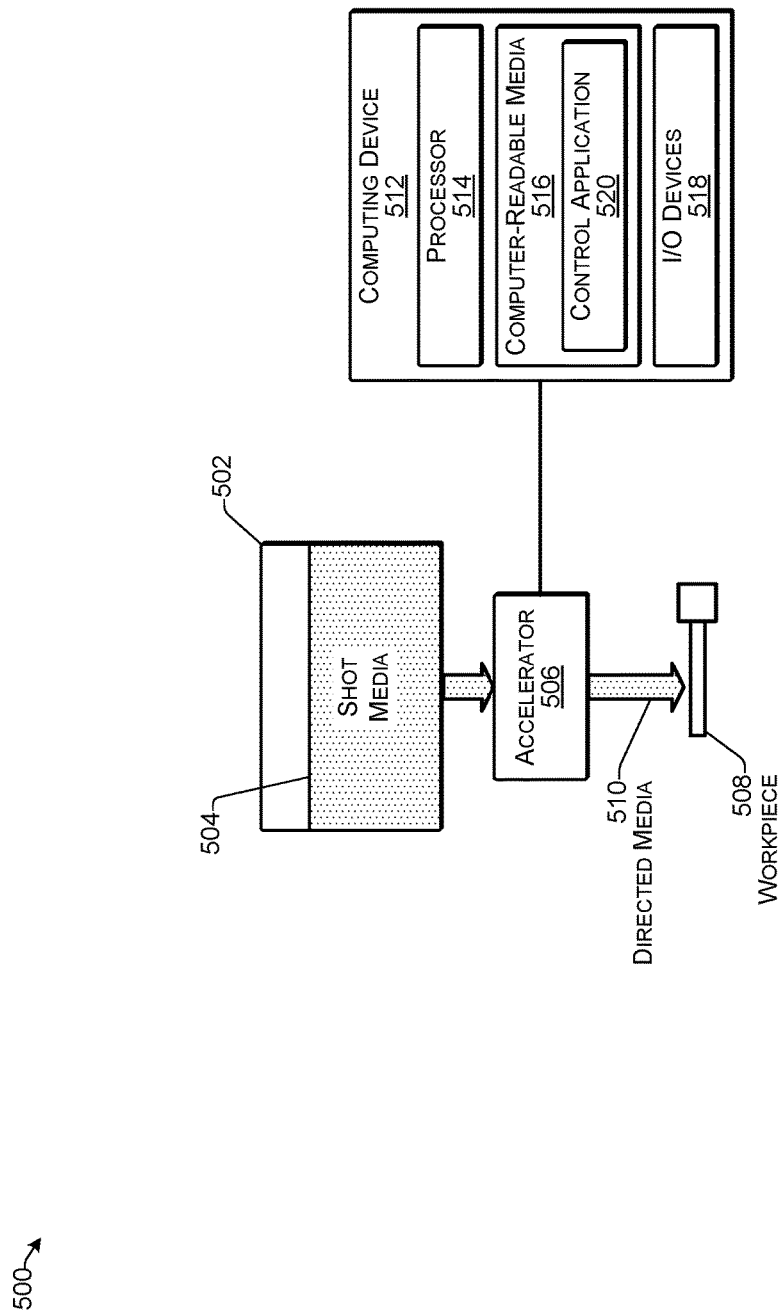
FIG. 5 illustrates an example shot peening apparatus according to some implementations.

FIG. 5 illustrates an example shot peening apparatus 500 according to some implementations. The apparatus 500 may include a shot media container 502 for containing shot media 504. The shot media 504 may be provided to an accelerator 506 that accelerates the shot media 504 against at least a portion of a surface of a workpiece 508 that is being subjected to the long duration shot peening process described herein. Directed media 510 impacts the workpiece 508, and may be recycled back into the shot media container 502. As mentioned above, broken media may be removed from the shot media 504 that is returned to the shot container 502 to prevent an increase in surface roughness due to sharp edges.

Examples of accelerators 506 for propelling the shot media 504 against the workpiece 508 may include air blast systems and centrifugal blast wheels. In an air blast system, shot media may be introduced by various methods into the path of high-pressure air and accelerated through a nozzle directed at the workpiece portion to be peened. On the other hand, a centrifugal blast wheel may include a high-speed paddle wheel for accelerating the shot media 504. For instance, shot media 504 may be introduced in the center of the spinning wheel and propelled by centrifugal force by the spinning paddles towards the part by adjusting the media entrance location, effectively timing the release of the directed media 510.

As mentioned above, the shot media 504 may include spherical cast steel shot ranging from S70 (0.18 mm) to S660 (1.68 mm) diameter. In some cases, the shot size may be selected to have the smallest diameter that is still able to be used to achieve a selected intensity, as determined, e.g., using the Almen strip technique discussed above. For example, smaller shot sizes may result in a smoother surface. Steel shot typically has a hardness of 45-52 HRC (445-545 HV), and is therefore substantially harder than the annealed treated materials herein. However, other media having hardness greater than that of the treated material may be used in place of steel shot if able to be used to achieve the specified intensity and without substantially increasing surface roughness over the disclosed technique.

Examples of other types of shot media 504 may include ceramic beads, glass beads, conditioned cut wire, or shot made of other types of metal. In some cases, the size of the shot media and type of shot media may be limited by the type of accelerator 506 used. For example, some accelerators 506 may not be able to propel small/light shot at sufficient velocities to achieve a desired intensity.

In some examples, a computing device 512 may be included for controlling operation of the shot peening apparatus 500. For example, the computing device 512 may include a processor 514, computer-readable media 516, and I/O devices 518. The processor 514 may be implemented as one or more microprocessors, microcomputers, microcontrollers, digital signal processors, central processing units, state machines, logic circuitries, and/or any devices that manipulate signals based on operational instructions. In some cases, the processor 514 may be one or more hardware processors and/or logic circuits of any suitable type specifically programmed or configured to execute the algorithms and processes described herein. The processor 514 may be configured to fetch and execute computer-readable, processor-executable instructions stored in the computer-readable media 516.

The computer-readable media 516 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 516 may include, but is not limited to, RAM, ROM, EEPROM, flash memory, solid-state storage, magnetic disk storage, optical storage, and/or other computer-readable media technology. Accordingly, the computer-readable media 516 may be computer storage media able to store instructions, modules, or applications that may be executed by the processor 514. Further, when mentioned, non-transitory computer-readable media exclude media such as energy, carrier signals, electromagnetic waves, and signals per se.

The computer-readable media 516 may be used to store and maintain functional components that are executable by the processor 514. In some implementations, these functional components comprise instructions or programs that are executable by the processor 514 and that, when executed, implement operational logic for controlling the shot peening apparatus 500. Functional components stored in the computer-readable media 516 may include a control application 520, which may include a series of instructions and/or executable code to enable an operator to control the shot peening intensity and shot peening duration of the shot peening apparatus 500. In addition, the computer-readable media 516 may also store data, data structures, and the like, that are used by the functional components.

The I/O devices 518 may include a display, various user interface controls (e.g., buttons, joystick, keyboard, mouse, touch screen, etc.), audio speakers, connection ports, communication interfaces, and so forth. Further, the computing device 512 may include other logical, programmatic, and/or physical components, of which those described are merely examples that are related to the discussion herein.

Figure 6:
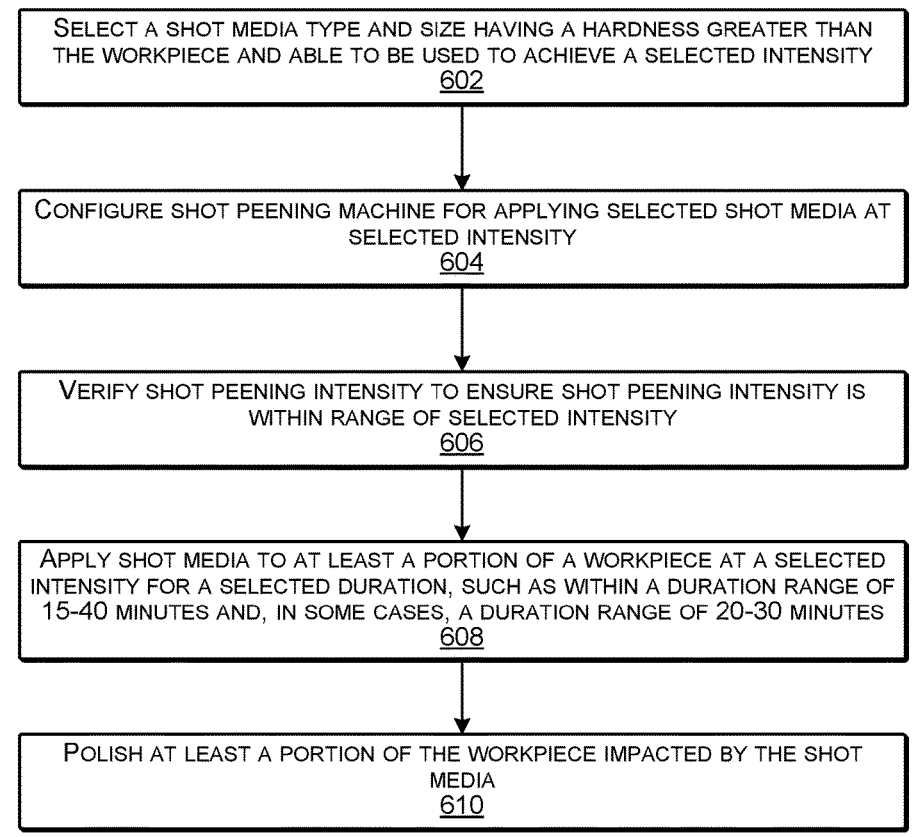
FIG. 6 is a flow diagram illustrating an example process for surface treatment according to some implementations.
Figure 7:
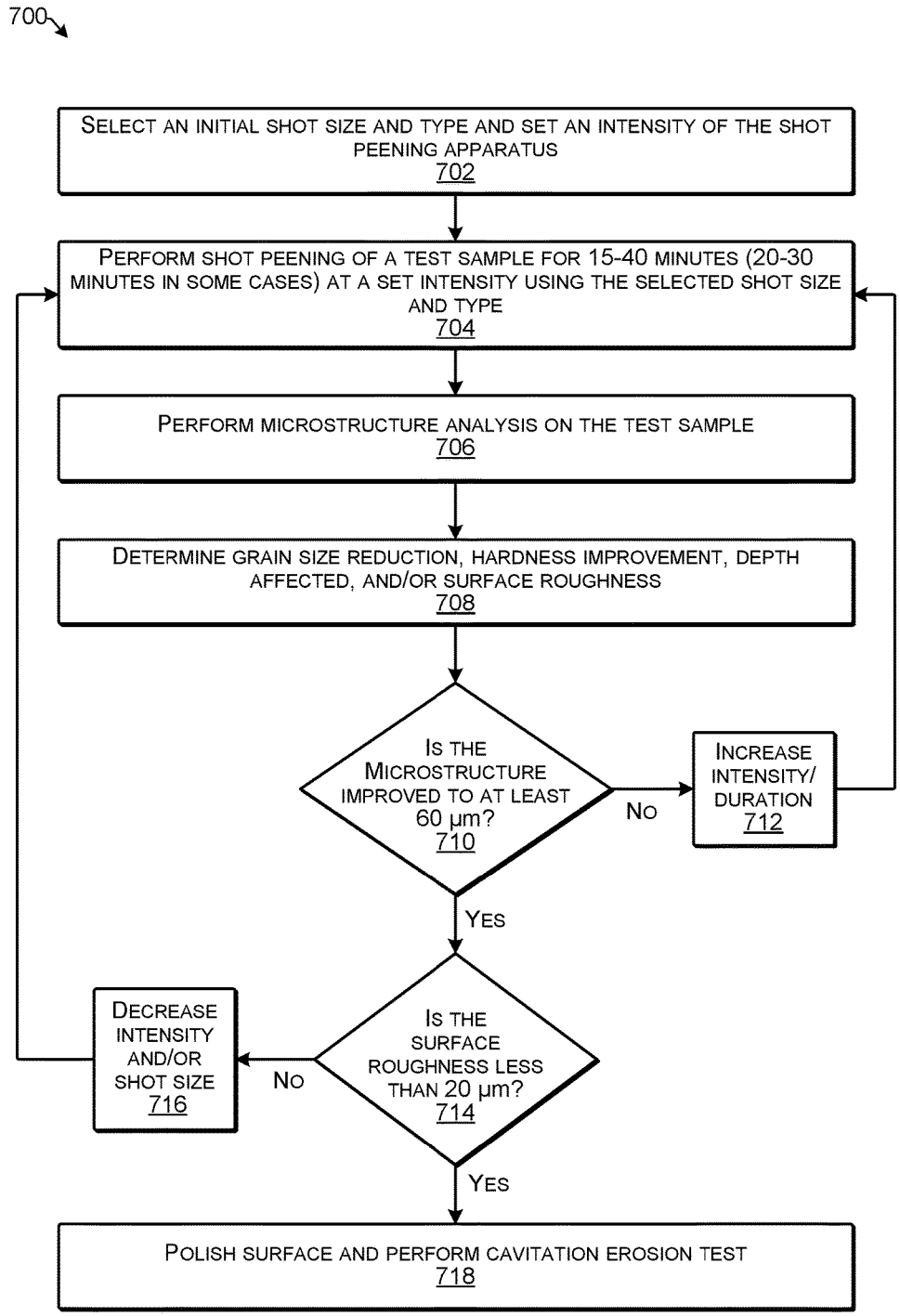
FIG. 7 is a flow diagram illustrating an example process for determining shot peening parameters according to some implementations.

FIGS. 6 and 7 are flow diagrams illustrating example processes according to some implementations. The processes are illustrated as collections of blocks in logical flow diagrams, which represent a sequence of operations. The order in which the blocks are described should not be construed as a limitation. For instance, some of the described blocks can be combined in other orders and/or in parallel to implement the processes, or alternative processes, and not all of the blocks need be executed. For discussion purposes, the processes are described with reference to the environments, apparatuses, and materials described in the examples herein, although the processes may be implemented in a variety of other environments, apparatuses, and materials.

FIG. 6 is a flow diagram illustrating an example process 600 for the surface treatment of austenitic stainless steel, such as 316 series stainless steel, for enhancing the resistance to cavitation erosion. For instance, the treated workpieces may be used has components in pumps, propellers, impellers, valves, and other fluid system components susceptible to cavitation erosion. The process 600 includes a shot peening treatment to the material surface and may further include a subsequent surface polishing process. No further treatment is typically necessary after the shot peening treatment and polishing are complete.

At 602, a shot media type and size having a hardness greater than the workpiece and able to be used to achieve a selected intensity may be selected. For example, the selected shot may have sufficient mass such that the shot peening machine is able to accelerate the shot media sufficiently for achieving the selected intensity. FIG. 7 includes a process for determining the shot media and intensity for particular materials. In some cases, the shot media may be cast steel shot ranging from S70 (0.18 mm) to S660 (1.68 mm). Further, in some examples, the shot media may be selected to have the smallest diameter that is able to be used to achieve a selected intensity.

At 604, the shot peening machine is configured for applying the selected shot media at a selected intensity. For instance, the computing device may be configured to cause the shot peening machine to operate for directing the selected media toward a workpiece at the selected intensity.

At 606, the intensity may be verified to ensure that the intensity is within a specified range. For instance, as a test before performing the surface treatment of a workpiece, the shot peening intensity may be verified using the Almen strip technique discussed above or other suitable shot peening intensity measurement technique.

At 608, the shot media is applied to at least a portion of a workpiece at the selected intensity for a selected time. For instance, the shot peening may be performed at an intensity of 5A-10A for a duration having a range between 15 and 40 minutes to achieve a relatively thick increased hardness layer while the surface remains relatively smooth. Further, in some examples, the shot peening may be performed at an intensity of 5A-7A for a duration having a range between 20 and 30 minutes as an optimal shot peening duration and intensity for achieving good penetration of the increased hardness layer without substantially increasing surface roughness. For instance, the resulting depth at which the hardness is increased may be 60 μm or greater, as compared to the induced surface roughness, which may be less than 20 μm. Thus, the increased hardness layer may be at least three times the surface roughness in some examples.

At 610, at least a portion of the workpiece impacted by the shot media may be polished. For example, the portion of the workpiece may be polished to remove approximately 10-30 μm of material from the surface as a machining allowance. As one example, if the maximum surface roughness is 17 μm, then 20 μm of material may be removed, leaving at least approximately 40 μm or more of material in which the grain size has been substantially reduced and the hardness more than doubled by the shot peening process.

FIG. 7 is a flow diagram illustrating an example process for selecting appropriate shot peening processing conditions for a material according to some implementations.

At 702, an initial shot size and type may be selected and an intensity of the shot peening apparatus may be set.

At 704, shot peening of a test sample may be performed for 15-40 minutes at a set intensity using selected shot size and type. Further, in some cases, the shot peening may be performed for 20-30 minutes as an optimal shot peening duration for achieving good penetration of the increased hardness layer without substantially increasing surface roughness.

At 706, microstructure analysis may be performed on the test sample.

At 708, the grain size reduction, the hardness improvement, the depth of the hardness improvement/grain size reduction, and the surface roughness may be determined.

At 710, it is determined whether the microstructure is improved to at least 60 μm. If not, the process goes to block 712; if so, the process goes to block 714.

At 712, the shot peening intensity and/or the shot peening duration is increased and the process goes to block 704 to perform shot peening on another test sample using the changed parameter(s). For example, if the shot peening was performed for only 16 minute during the first test, the shot peening duration may be increased to 25 minutes at the same intensity, or at an increased intensity.

At 714, if the microstructure is improved to a depth of at least 60 μm, it is determined whether the surface roughness is less than 20 μm. If not, the process goes to block 716; if so, the process goes to block 718.

At 716, if the surface roughness is greater than 20 μm, the intensity and/or the shot size may be decreased. For example, if the intensity was increased previously at block 712, then the shot size might be decreased.

At 718, the surface may be polished in some cases, and a cavitation erosion test may be performed to confirm that the improved microstructure corresponds to improved cavitation erosion resistance.

The example processes described herein are only examples of processes provided for discussion purposes. Numerous other variations will be apparent to those of skill in the art in light of the disclosure herein. Additionally, while the disclosure herein sets forth several examples of suitable environments, apparatuses and materials for the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A method of treating a surface of austenitic stainless steel to increase resistance to cavitation erosion, the method comprising impacting the surface with shot media for a shot peening duration of 15 to 40 minutes at a shot peening intensity corresponding to an Almen strip type A intensity of 5A to 10A.

2. The method as recited in claim 1, wherein the shot media is cast steel shot having a size range between 0.18 mm to 1.68 mm.

3. The method as recited in claim 1, wherein the shot peening duration is between 20 and 30 minutes.

4. The method as recited in claim 3, wherein the shot peening intensity is in a range from 5A to 7A, and the shot media is steel shot having a size range from 0.58 mm to 0.99 mm.

5. The method as recited in claim 1, further comprising polishing the surface to remove 10 to 30 μm of material.

6. The method as recited in claim 1, wherein the austenitic stainless steel includes 18-20% Cr and 2.0-3.0% Mo.

7. The method as recited in claim 1, wherein the treatment provides an increase in hardness to a depth of at least 60 μm from the surface and a surface roughness of less than 20 μm.

8. A method comprising shot peening a surface of a material for a shot peening duration of 15 to 40 minutes at a shot peening intensity corresponding to an Almen strip type A intensity of 5A to 10A, wherein:
the material has an austenitic crystalline structure, and
a shot media used during the shot peening has a hardness greater than the material when the material is in an annealed condition.

9. The method as recited in claim 8, wherein the shot media is cast steel shot having a size range between 0.18 mm to 1.68 mm.

10. The method as recited in claim 8, wherein the shot peening duration is between 20 and 30 minutes.

11. The method as recited in claim 8, wherein the shot peening intensity is in a range from 5A to 7A, and the shot media is steel shot having a size range from 0.58 mm to 0.99 mm.

12. The method as recited in claim 8, further comprising:
following the shot peening, determining that a roughness of the surface exceeds 20 μm; and
decreasing at least one of:
a shot media size, or
the shot peening intensity while maintaining the shot peening intensity within a range of 5A-10A.

13. The method as recited in claim 8, further comprising:
following the shot peening, determining that a depth of an increased hardness layer is less than 60 µm; and
increasing at least one of:
the shot peening intensity while maintaining the shot peening intensity within a range of 5A-10A, or
the shot peening duration, while maintaining the duration within a range of 15-40 minutes.

14. The method as recited in claim 8, wherein the material is an austenitic stainless steel including 18-20% Cr and 2.0-3.0% Mo.

15. A method comprising:
impacting a surface of a material having an austenitic crystalline structure with shot media for a duration ranging from 15 and 40 minutes at an Almen strip type A intensity ranging from 5A to 10A; and
polishing the surface to remove 10 to 20 µm of the material.

16. The method as recited in claim 15, wherein the shot media is cast steel shot having a size range between 0.18 mm to 1.68 mm.

17. The method as recited in claim 15, wherein the duration ranges between 20 and 30 minutes.

18. The method as recited in claim 17, wherein the shot peening intensity is in a range from 5A to 7A, and the shot media is steel shot having a size range from 0.58 mm to 0.99 mm.

19. The method as recited in claim 15, wherein the material is austenitic stainless steel including 18-20% Cr and 2.0-3.0% Mo.

20. The method as recited in claim 15, wherein
following the shot peening, prior to the polishing, determining that a roughness of the surface exceeds 20 µm; and
decreasing at least one of:
a shot media size, or
the shot peening intensity while maintaining the shot peening intensity within a range of 5A-10A.

* * * * *